US008930907B2

(12) United States Patent
Burckhardt et al.

(10) Patent No.: US 8,930,907 B2
(45) Date of Patent: Jan. 6, 2015

(54) CONCURRENCY SOFTWARE TESTING WITH PROBABILISTIC BOUNDS ON FINDING BUGS

(75) Inventors: Sebastian Carl Burckhardt, Sammamish, WA (US); Pravesh Kumar Kothari, Chandrapur (IN); Madanlal S. Musuvathi, Redmond, WA (US); Santosh Ganapati Nagarakatte, Philadelphia, PA (US)

(73) Assignee: Microsoft Corporation, Redmond, WA (US)

( * ) Notice: Subject to any disclaimer, the term of this patent is extended or adjusted under 35 U.S.C. 154(b) by 923 days.

(21) Appl. No.: 12/628,223

(22) Filed: Dec. 1, 2009

(65) Prior Publication Data

US 2011/0131550 A1 Jun. 2, 2011

(51) Int. Cl.
G06F 9/44 (2006.01)
G06F 11/36 (2006.01)

(52) U.S. Cl.
CPC ........ G06F 11/3632 (2013.01); G06F 11/3688 (2013.01)
USPC ........... 717/124; 717/126; 717/127; 717/131; 718/102; 718/103; 714/25; 714/32; 714/33; 714/35

(58) Field of Classification Search
None
See application file for complete search history.

(56) References Cited

U.S. PATENT DOCUMENTS

| | | | | |
|---|---|---|---|---|
| 5,953,530 A * | 9/1999 | Rishi et al. | ..... | 717/127 |
| 6,212,544 B1 * | 4/2001 | Borkenhagen et al. | ....... | 718/103 |
| 6,754,850 B2 * | 6/2004 | Grey et al. | ..... | 714/33 |
| 6,971,084 B2 * | 11/2005 | Grey et al. | ..... | 717/106 |
| 7,093,249 B2 * | 8/2006 | Melamed et al. | ..... | 718/100 |
| 7,103,597 B2 | 9/2006 | McGoveran | ..... | 707/8 |
| 7,401,208 B2 * | 7/2008 | Kalla et al. | ..... | 712/224 |
| 7,752,369 B2 * | 7/2010 | Kailas et al. | ..... | 710/244 |
| 8,301,857 B2 * | 10/2012 | Ogasawara | ..... | 711/170 |
| 8,689,223 B2 * | 4/2014 | Dadhich et al. | ..... | 718/103 |
| 2002/0122062 A1 * | 9/2002 | Melamed et al. | ..... | 345/763 |
| 2002/0124042 A1 * | 9/2002 | Melamed et al. | ..... | 709/102 |
| 2002/0124205 A1 * | 9/2002 | Grey et al. | ..... | 714/33 |
| 2002/0124241 A1 * | 9/2002 | Grey et al. | ..... | 717/149 |
| 2004/0215947 A1 * | 10/2004 | Ward et al. | ..... | 712/245 |
| 2005/0177775 A1 * | 8/2005 | Qadeer et al. | ..... | 714/38 |
| 2006/0161897 A1 | 7/2006 | Biberstein et al. | ..... | 717/124 |
| 2006/0212759 A1 * | 9/2006 | Campbell et al. | ..... | 714/38 |
| 2008/0320459 A1 * | 12/2008 | Morris | ..... | 717/162 |
| 2009/0044174 A1 * | 2/2009 | Dolby et al. | ..... | 717/127 |

(Continued)

OTHER PUBLICATIONS

'Multithreaded Java program test generation' by O. Edelstein et al., IBM Systems Journal, 41(1):111-125, 2002.*

(Continued)

*Primary Examiner* — Steven Snyder
(74) *Attorney, Agent, or Firm* — Sandy Swain; Brian Haslam; Micky Minhas (57) ABSTRACT

Described is a probabilistic concurrency testing mechanism for testing a concurrent software program that provides a probabilistic guarantee of finding any concurrent software bug at or below a bug depth (that corresponds to a complexity level for finding the bug). A scheduler/algorithm inserts priority lowering points into the code and runs the highest priority thread based upon initially randomly distributed priorities. When that thread reaches a priority lowering point, its priority is lowered to a value associated (e.g., by random distribution) with that priority lowering point, whereby a different thread now has the currently highest priority. That thread is run until its priority is similarly lowered, and so on, whereby all schedules needed to find a concurrency bug are run.

20 Claims, 5 Drawing Sheets

(56) References Cited

U.S. PATENT DOCUMENTS

| | | | | |
|---|---|---|---|---|
| 2009/0113399 | A1 | 4/2009 | Tzoref et al. | 717/130 |
| 2009/0125887 | A1 | 5/2009 | Kahlon et al. | 717/126 |
| 2009/0282178 | A1* | 11/2009 | Kailas et al. | 710/244 |
| 2010/0125848 | A1* | 5/2010 | Dadhich et al. | 718/103 |
| 2011/0314338 | A1* | 12/2011 | Erickson et al. | 714/37 |
| 2012/0233584 | A1* | 9/2012 | Ivancic et al. | 717/104 |

OTHER PUBLICATIONS

'Real-time Java, Part 3: Threading and synchronization' by Patrick Gallop et al., Apr. 24, 2007.*

'Testing Concurrent Java Programs using Randomized Scheduling' by Scott D. Stoller, Workshop on Runtime Verification (RV'02), vol. 70 of ENTCS, 2002.*

'Effective Random Testing of Concurrent Programs' by Koushik Sen, ASE '07, copyright ACM 2007.*

'Race Directed Random Testing of Concurrent Programs' by Koushik Sen, PLDI '08, copyright ACM 2008.*

Farchi, et al., "Concurrent Bug Patterns and How to Test Them", Retrieved at <<http://ieeexplore.ieee.org/stamp/stamp.jsp?tp=&isnumber=&arnumber=1213511>> In the Proceedings of the 17th International Parallel and Distributed Processing Symposium (IPDPS'03) Apr. 22-26, 2003, pp. 7.

Ball, et al., "First-class Concurrency Testing and Debugging", Retrieved at <<http://research.microsoft.com/en-us/projects/chess/ec2-submission.pdf>> Sep. 15, 2009, pp. 4.

Eytani, et al., "Experience with a Concurrency Bugs Benchmark", Retrieved at <<http://personal.cis.strath.ac.uk/~marc/TESTBENCH08/Papers/tzoref.pdf>> In the proceedings of the 2008 IEEE International Conference on Software Testing Verification and Validation Workshop, Sep. 15, 2009, pp. 4.

Krena, et al., "A Concurrency Testing Tool and its Plug-ins for Dynamic Analysis and Runtime Healing", Retrieved at <<http://www.fit.vutbr.cz/~iletko/pub/FIT-TR-2009-01.pdf>> Sep. 15, 2009, pp. 15.

* cited by examiner

CONCURRENCY SOFTWARE TESTING WITH PROBABILISTIC BOUNDS ON FINDING BUGS

BACKGROUND

Concurrent software programs are known to be prone to having software bugs, including bugs that result from the concurrent nature of the programs. In general, concurrency bugs occur when instructions are scheduled in an order not envisioned by the programmer. Concurrency software bugs are thus those that appear only on particular thread schedules. Many concurrent bugs are difficult to find because they are often dependent upon rare thread schedules.

A concurrent software program contains one or more threads of control, (referred to simply as "threads" hereinafter). In specific circumstances, these threads may refer to processes, threads within a process, processors in the computer hardware, and/or nodes in a distributed system. Common names for concurrent threads of control include, but are not limited to, threads, processes, nodes, agents, tasks and components, A general goal of concurrency testing is to effectively identify which schedules, of the exponentially many possible schedules, are those in which concurrency bugs appear. Known testing methods involve various forms of stress testing, in which the program being tested is run for days or even weeks under heavy loads with the hope of hitting buggy schedules. This is a slow and expensive process. Moreover, any bugs that are found via stress testing are difficult to reproduce and/or debug.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which a probabilistic concurrency testing mechanism tests a concurrent software program, while providing a probabilistic guarantee of finding any concurrent software bug at or below a bug depth (that corresponds to a complexity level for finding the bug). The mechanism includes a scheduler associated with an algorithm, which operates by scheduling a currently highest priority thread (that is enabled to run) until a priority lowering point inserted into the code is reached. At that point, the mechanism lowers the priority of the thread that reached the priority lowering point, whereby a different thread now has the currently highest priority. That thread is run until its priority is similarly lowered, and so on, whereby all schedules needed to find a bug are run.

In one implementation, the priority lowering points are inserted into the concurrent program and assigned priority values based upon random mathematical distribution. Threads are also assigned initial priorities based upon random mathematical distribution. The priority lowering point insertions may be optimized so as to only be present when there is a chance of having a concurrency bug, e.g., relative to synchronized operations and in non-sequential execution paths.

In one implementation, the probabilistic algorithm is "derandomized" (which is a commonly known transformation of probabilistic algorithms) in the that instead of using randomly selected values according to a uniform mathematical distribution, the algorithm is repeated in such a way as to enumerate exhaustively all possible random choices, or a suitable selected subset of those random choices.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards a randomized scheduler/probabilistic concurrency testing algorithm for finding concurrency bugs that provides a probabilistic guarantee of finding bugs. Repeated independent execution of the probabilistic concurrency testing algorithm by the scheduler (e.g., on a general purpose computer system) can arbitrarily decrease the probability of missing a bug. The scheduler improves upon current stress testing methods by finding bugs more effectively, and by quantifying the probability of missing any bugs.

As described below, the randomized scheduler is based on manipulating thread priorities, where threads with lower priorities run only when all higher priority threads are disabled. In other words, of the threads that are able to run, only the highest priority thread runs. In one aspect, a scheduling algorithm of the randomized scheduler initially assigns thread priorities at random. During execution, the scheduling algorithm lowers thread priorities at certain randomly-selected steps, whereby all thread schedules are probabilistically guaranteed to run to a determinable probability. Note that as used herein, "random" and its variations ("randomly" and the like) do not mean arbitrary, but rather refer to a uniformly random mathematical distribution within a range.

It should be understood that any of the examples herein are non-limiting. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing and program testing in general.

Figure 1:
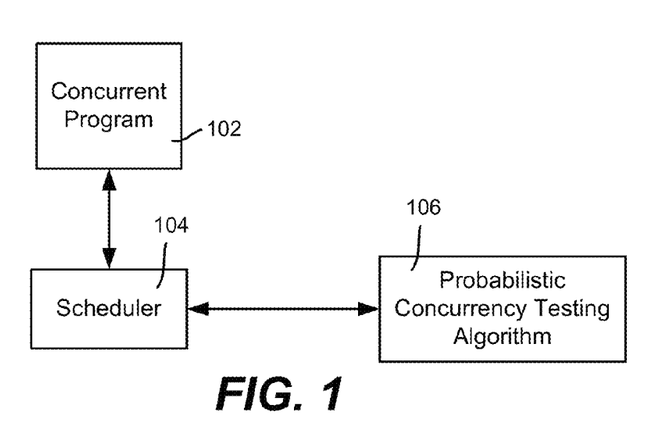
FIG. 1 is a block diagram representing a probabilistic concurrency testing mechanism that tests a concurrent software program via a scheduler associated with an algorithm.

Turning to FIG. 1, there is shown a program 102 being tested by a scheduler 104 that includes or is otherwise associated with a probabilistic concurrency testing algorithm 106 to probabilistically find bugs in basically every run of the program. As described below, the scheduler 104 is priority-based, in that the scheduler 104 maintains a priority for every thread, wherein in one implementation, lower numbers indicate lower priorities. During execution, the scheduler 104 schedules a low priority thread only when all high priority threads are disabled. Note that a thread may be disabled if it is waiting for a resource, such as a lock, currently held by another thread.

Threads can change priorities during execution when they pass a priority lowering point that has been inserted into the program, as described below. Each such point is a step in the dynamic execution. When a thread passes a lowering point, the scheduler 104 lowers the thread priority to the priority of the lowering point.

In one aspect, a depth-metric is used, which characterizes the difficulty of finding a bug. The depth of a concurrency software bug is characterized as the minimum number of scheduling constraints required to find the bug. Given a program and a concurrency bug, a set of instruction-ordering constraints is said to find the bug, if any schedule satisfying the ordering constraints results in the bug.

Concurrency bugs may thus be classified according to a depth metric. The scheduler is designed to provide better probabilistic guarantees for bugs with smaller depth by biasing the distribution of schedules. Note that it is possible for different sets of ordering constraints to trigger the same bug, in which case the probability of satisfying at least one of these sets (and thus exposing the bug) increases accordingly.

Figure 2:
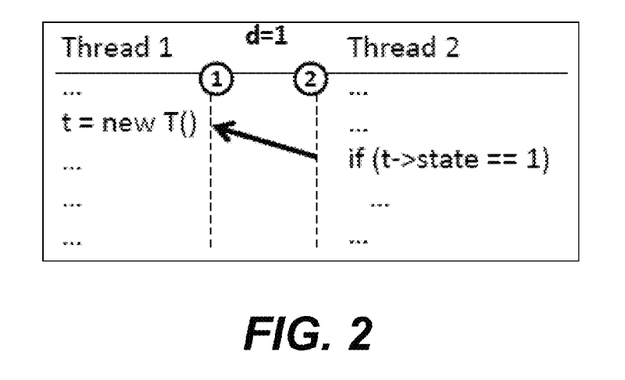
FIGS. 2-7 are representations of software code containing concurrent software bugs, and constraints for finding those bugs.
Figure 3:
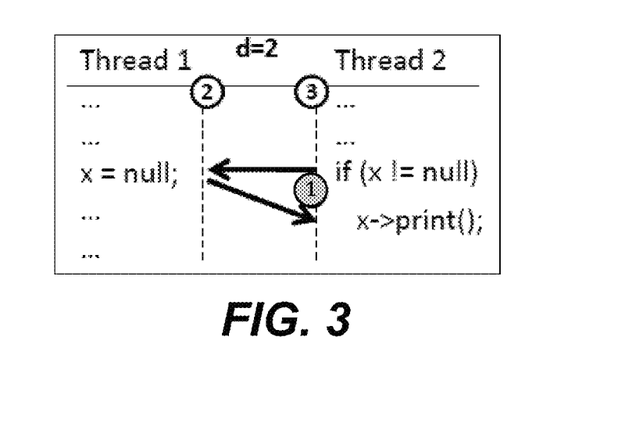
Figure 4:
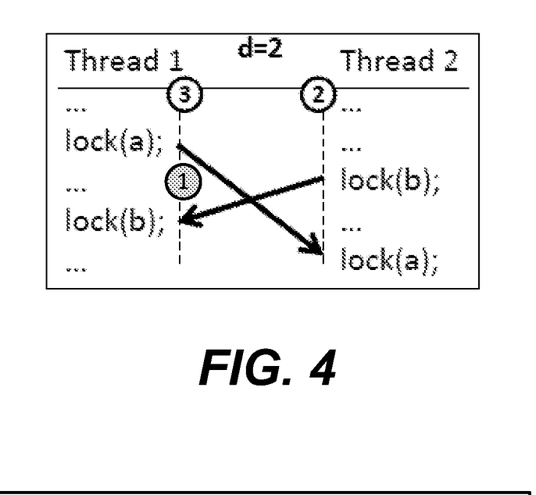

By way of example, FIGS. 2-4 show examples of common concurrency errors with ordering constraints (represented by the arrows) that are sufficient to find the bug. Any schedule that satisfies these ordering constraints is guaranteed to find the bug irrespective of how it schedules instructions not relevant to the bug. Note that in FIGS. 2-4, the bug depths of one, two and two, respectively, are represented by the "d=1" "d=2" and "d=2" notation at the top of each example. In practice, many concurrency software bugs have small such bug-depths.

FIG. 2 shows one well-known type of bug referred to as an ordering error, in which one thread (Thread 1) needs to execute (e.g., to initialize a value) before another thread (Thread 2) executes (e.g., to operate on the initialized value). This bug is only found if the ordering is such that Thread 2 executes before Thread 1 executes.

FIG. 3 illustrates another well-known type of concurrency software bug, namely an atomicity violation, in which, for example Thread 2 tests for a condition (x!=null)) and performs an instruction (x->print( )) if met. The bug occurs if between the test and the next instruction, which should be atomic operations, another thread (Thread 1) changes the condition that was evaluated.

FIG. 4 illustrates another well-known concurrency software bug, namely a deadlock. Deadlocks are caused by circular lock acquisition, and in the example of FIG. 4 have depth two; more generally, however, deadlocks are depth n if n threads are involved.

Thus, in general, ordering bugs have depth one, atomicity violations and non-serializable interleavings, in general, have depth two, and deadlocks caused by circular lock acquisition have depth n for n threads. However, these depth classifications are not strict. For instance, not all atomicity violations have a depth two, as in practice, some reported atomicity violations have a depth of one. In any event, the concept of bug-depths is more general than these examples, and can capture concurrency bugs not classified before.

Figure 5:
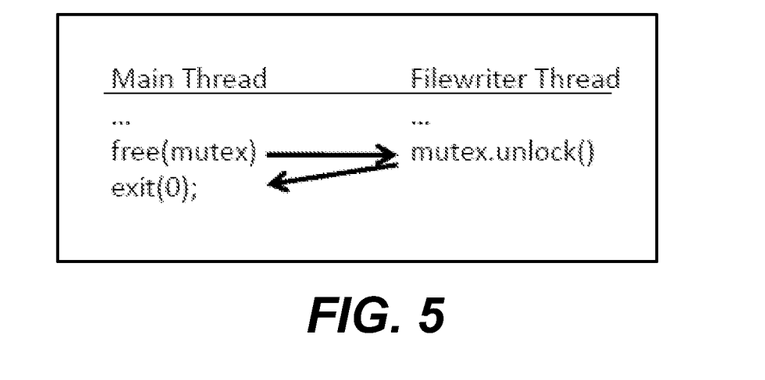

FIG. 5 shows an example of a bug of depth two that surfaces if the mutex is unlocked after it is freed, and the mutex is unlocked before the main thread terminates the process by calling exit.

Figure 6:
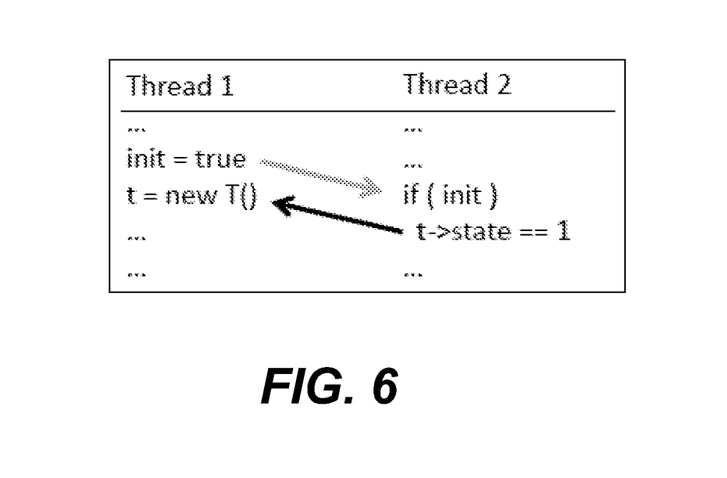

FIG. 6 shows an example of a bug of depth two that does not directly fall into any of the above-described categories. In particular, the ordering constraints do not have to be between instructions that access the same variable. Because of interaction with control flow, in the example of FIG. 6 the program (incorrectly) maintains a Boolean variable "init" to indicate whether t is initialized or not. The single ordering constraint (the black arrow) between the initialization and access of t is not sufficient to find the bug. Although it may seem as if one constraint (black arrow) is sufficient to find this bug, an extra constraint (the gray arrow) is needed to ensure that thread 2 really executes the access of t. Thus, the depth of this bug is two because of the presence of control flow, and the scheduler needs to also ensure the ordering constraint between init accesses, that is, the grey arrow.

As can be seen, bug-depth is inherently tied to the difficulty of finding the concurrency bug. In a program with complex control flow, the depth of a bug may not be readily apparent to the programmer. However, the technology described herein does not require the programmer or a prior program analysis to identify these constraints explicitly, but rather relies on the mere existence of the correct number of ordering constraints.

Bug depth is thus fundamentally different than the concept of a preemption bound of a bug, which is the smallest number of preemptions sufficient to find the bug and is a property of a single schedule. In contrast to a preemption bound, bug depth is a property of all schedules that share the same root cause of the bug. This universality allows the scheduler to provide a probabilistic guarantee on every run of the program, unlike a preemption bound that is useful for providing absolute coverage guarantees, but only after systematically enumerating all schedules with a given preemption bound.

Probabilistic concurrency testing (PCT) is a method that may implemented by the scheduler of a general purpose computer that provides probabilistic guarantees on finding concurrency bugs. On each run of a program, probabilistic concurrency testing schedules the threads in the program such that any concurrency bug is hit with a given probability. This probability is based on the number of threads t in the program, the number of synchronization operations n performed by the program, and the depth-metric d of the bug that determines the difficulty of finding the bug. Running probabilistic concurrency testing repeatedly with different random seeds ensures that a concurrency bug can be found with an arbitrarily large probability.

More particularly, given a program with n threads that executes k instructions, the probabilistic concurrency testing scheduler can find a bug with depth d with a probability of $$\frac{1}{nk^{d-1}}.$$

This guarantee is provided as follows:
 a) The scheduler picks random initial thread priorities for the n threads in the range [d, d+1, d+2, . . . d+n].
 b) The scheduler also picks d−1 random priority lowering points $k_1, \ldots, k_{d-1}$ at random steps in the range [1 . . . k]. Each lowering point $k_i$ is assigned the priority i.
 c) The scheduler schedules the threads by honoring their priorities. When a thread reaches the lowering point $k_i$, it sets the priority of the thread to i.

Figure 7:
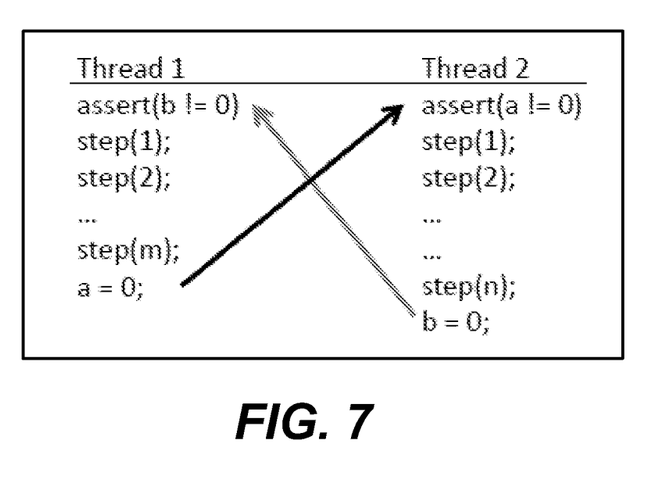

It should be noted that naive randomized schedulers, which effectively "flip a coin" in each step to decide which thread to schedule next, are not adequate. By way of example, consider the example program of FIG. 7 with two bugs of depth one, shown by the black arrow; (the grey arrow is considered later). A naive randomized scheduler is very unlikely to detect the bug in FIG. 7 even though its depth is only one. This is because to force the black arrow constraint, such a scheduler has to consistently schedule Thread 1 for m+2 steps, resulting in a probability that is inverse exponential in m, which is a very small quantity even for a moderate m. To try to improve such a scheduler by biasing the execution towards Thread 1, and thereby increase the likelihood of hitting this bug, not only still contains an exponential in m, but also biases against finding the second bug represented by the grey constraint.

FIG. 2 also represents how the probabilistic concurrency testing algorithm finds the ordering error, and illustrates the probabilistic guarantee. FIG. 2 shows the initial thread priorities in white circles. To understand the working of the scheduler, observe that a high priority thread runs faster than a low priority thread. So, barring priority inversion issues, an ordering constraint a→b is satisfied if a is executed by a higher priority thread. In FIG. 2, the bug is found if the scheduler chooses a lower priority for Thread 1 than Thread 2. The probability of this is 1/2 and thus the scheduler is expected to find this bug within the first two runs.

If there are more than two threads in the program, then the algorithm has to perform more work because of priority inversion issues. For example, even if Thread 1 has a lower priority than Thread 2, Thread 2 can be blocked on a resource held by another thread, Thread 3. If Thread 3 has a priority lower than Thread 1, then this priority inversion can allow Thread 1 to execute the initialization before Thread 2 reads t. However, such a priority inversion cannot happen if Thread 1 has the lowest priority of all threads in the program. The probability of this happening is 1/n, which is the guarantee. This is a worst-case analysis and the algorithm performs much better than 1/n in practice.

For bugs with depth greater than one, priority lowering points are used, as represented by the shaded circles in FIGS. 3 and 4. Note that in one implementation, the algorithm does not introduce priority lowering points when d=1.

In FIG. 3, the atomicity violation is induced if the scheduler inserts a priority lowering point after the null check but before executing the branch. The probability of this is 1/k as the scheduler picks the lowering point uniformly over all dynamic instructions. In addition, the scheduler needs to ensure the first constraint by running Thread 1 with lowest priority until Thread 2 performs the null check. Together, the probability of finding this atomicity violation is at least 1/nk.

The same concept applies the deadlock in FIG. 4. The scheduler inserts a priority lowering point after Thread 1 acquires the first lock before acquiring the second. Note again that this is a worst-case analysis, and there are many random choices that can trigger the bug. For instance, Thread 1 in FIG. 4 can perform many instructions between the two acquires. The scheduler will find the deadlock if it picks one of them to be a priority lowering point. Similarly, there exists a symmetric case in which the scheduler inserts a priority lowering point in Thread 2. Further, if the same buggy code is executed many times by different threads in different contexts, the scheduler gets multiple opportunities to trigger the bug. Experiments have shown that the scheduler finds bugs with a probability far greater than its worst-case bound.

Note that a program state may be represented abstractly by its schedules, in which each schedule is a sequence of thread identifiers. For example, the sequence 1 2 2 1 represents a schedule in which thread 1 takes one step, followed by two steps by thread 2, followed by another step of thread 1. Not all threads can be scheduled from all states, as they may be disabled (blocked or waiting).

The following algorithm is one implementation of the randomized scheduler, which is typically called with a conservative estimate for n (number of threads) and k (number of steps). During the progress of the algorithm, the current schedule is stored in the variable S, and the current thread priorities in an array p of size n. The thread priorities are initially assigned random values (chosen by the random permutation $\pi$). In each iteration, an enabled thread of maximal priority t is picked and scheduled for one step. The algorithm then checks if a priority lowering point has been reached (determined by the random values $k_i$), and if so, the priority of t is lowered accordingly. This process repeats until no more threads are enabled, that is, a deadlock is reached or the program has terminated.

```
Require: program P, d ≥ 0
Require: n ≥ maxthreads(P), k ≥ maxsteps(P)
Require: random variables k1, ... k_{d−1} ∈ {1,...,k}
Require: random variable π ∈ Permutations(n)
 1:    procedure RandS(n, k, d) begin
 2:        var S : schedule
 3:        var p : array[n] of N
 4:        S ← ∈
           // set initial priorities
 5:        for all t ∈ {1,...,n} do
 6:            p[t] ← d + π (t) − 1
 7:        end for
 8:        while en_P (S) ≠ 0 do
               /* schedule thread of maximal priority */
 9:            t ← element of en_P (S) such that p[t] maximal
10:            S ← S t
               /* at priority lowering point? */
11:            for all i ∈ {1,...,d−1} do
12:                if length(S) = k_i then
13:                    p[t] = d − i
14:                end if
15:            end for
16:        end while
17:        return S
18:    end
```

As described above, the scheduler is based on thread priorities. However, one implementation does not reuse the priority mechanisms already supported by modern operating systems. This is because the guarantees provided by the scheduler rely on a low priority thread proceeding strictly slower than a high priority thread, and operating systems' priorities do not provide this guarantee. In particular, priority boosting techniques can arbitrarily change user-intended priorities. Similarly, the scheduler would not be able to control the relative speeds of two threads with different priorities running concurrently on different processors.

For fine-grained priority control, one implementation of the scheduler is a user-mode scheduler that works on unmodified x86 binaries. It employs binary instrumentation to insert calls to the scheduler after every instruction that accesses shared memory or makes a system call. The scheduler gains control of a thread the first time the thread calls into the scheduler. From there on, the scheduler ensures that the thread makes progress only when all threads with higher priorities are disabled. Thread priorities are determined by the algorithm as described above.

Note that the scheduler needs to be starvation free. At the same time, it is common for concurrent programs to use spin loops. If, under the scheduler, a high priority thread spins waiting for a low priority thread, the program will livelock; to guarantee strict priorities, the scheduler does not schedule the low priority thread required for the high priority thread to make progress. To handle this case, one implementation employs heuristics to identify such spin loops and recovers from them.

The above-described algorithm is based upon the scheduler inserting a priority lowering point at randomly selected instructions. However, the need to insert a lowering point at an arbitrary instruction requires the scheduler to insert a callback after every instruction, which reduces the performance. Further, by counting the number of instructions executed, the large value for the parameter k can reduce the effectiveness, especially for bugs with depth greater than or equal to two.

One optimization to improve performance is directed towards identifying synchronization operations. As the scheduler uses priority lowering points to enforce ordering constraints in the program, in which the constraints represent effective communication between threads, priority lowering points may be inserted only at these synchronization operations. Such synchronization operations include system calls, calls to synchronization libraries (such as pthreads), hardware synchronization instructions (such as interlocked instructions), and shared memory synchronizations. Accesses to flag variables, volatile variables, and data races (both programmer intended and unintended) are classified as "shared-memory synchronization." This classification reflects the fact that these memory accesses result in communication between the threads.

In operation, any of a number of known data-race detection tools or hardware mechanisms may be used to identify such shared-memory synchronization points. In one implementation, these points may be supplied manually by the user; other forms of synchronization are straightforward to identify from the program binary. By only inserting priority lowering points at synchronization operations, we effectively reduce k by several orders of magnitude.

Another optimization is directed towards identifying sequential execution. In many applications, a significant portion of a concurrent program sequentially executes, that is, there is only one enabled thread at those portions. These sequential execution portions may be identified, so that priority lowering points need not be unnecessarily inserted. Note that the same effect can be achieved by reducing the priority at the point that the sequential thread enables/creates a second thread.

Programs written with a fork-join paradigm typically have multiple phases in which a single thread waits for a flurry of concurrent activity belonging to one phase to finish before starting the next phase. This is also a typical behavior of long running stress tests that perform multiple iterations of concurrency scenarios. One implementation of the scheduler identifies these phases whenever the program enters a state with one thread enabled. The effective k is the maximum number of synchronization operations performed per phase.

Some concurrency bugs manifest much later than when they occur. The scheduler sometimes misses some of the manifestations as the main thread exits prematurely at the end of the program. Artificially inserting a priority lowering point for the main thread before it exits helps detect such bugs.

Figure 8:
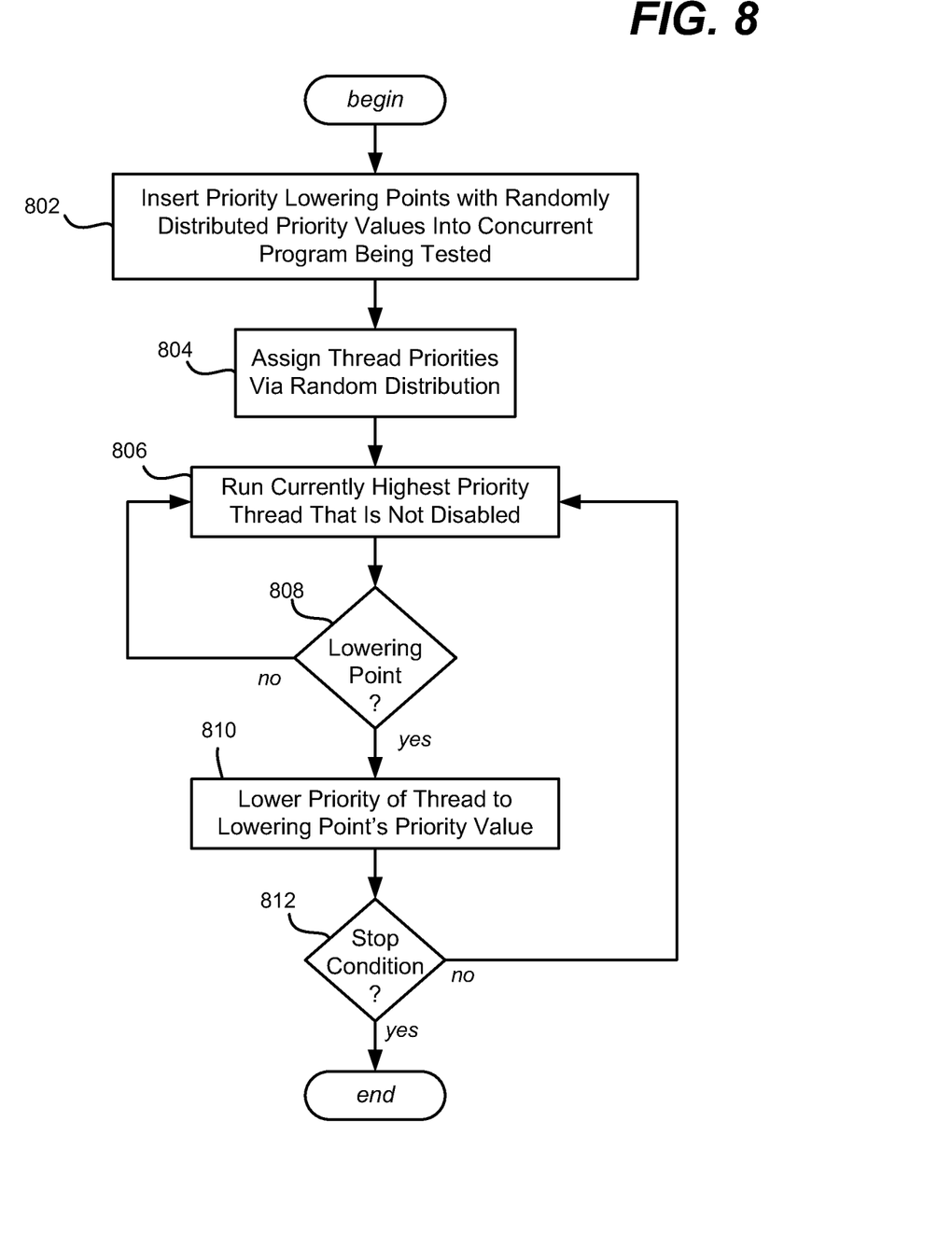
FIG. 8 is a flow diagram showing example steps that may be taken to test a concurrent software program with the probabilistic concurrency testing mechanism.

FIG. 8 summarizes certain steps of the scheduler/algorithm, beginning at step 802 where the lowering points are inserted, e.g., after each instruction or after optimizing for to insert them following synchronization operations and/or not within serial execution paths. Step 804 represents assigning the threads with initial priorities, via random distribution.

At step 806 the thread that currently has the highest priority (and is not disabled) is run. This thread continues to run until the lowering point is reached, as represented by step 808. Any concurrency bug that occurs while this thread is run may be abstractly represented by the set of schedules that found it.

As described above, when the lowering point is reached, the thread that was running has its priority changed to the value associated with the lowering point. When this occurs, another thread becomes the thread that currently has the highest priority and is thus run at step 806. The scheduling continues in this manner until a stop condition is met as represented by step 812, e.g., no more threads are enabled because of a deadlock or program termination.

Exemplary Operating Environment

Figure 9:
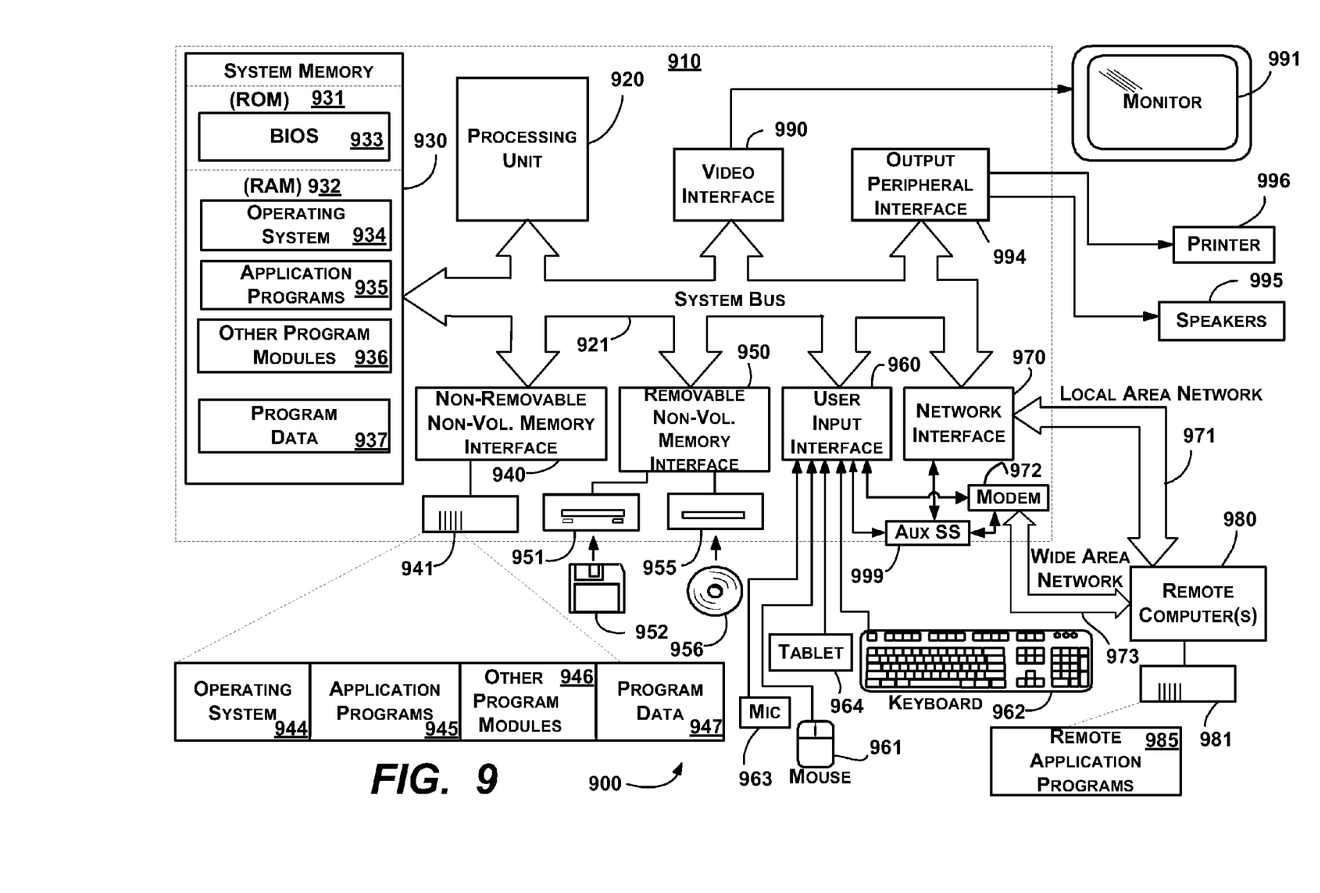
FIG. 9 shows an illustrative example of a computing environment into which various aspects of the present invention may be incorporated.

FIG. 9 illustrates an example of a suitable computing and networking environment 900 on which the examples of FIGS. 1-8 may be implemented. The computing system environment 900 is only one example of a suitable computing environment and is not intended to suggest any limitation as to the scope of use or functionality of the invention. Neither should the computing environment 900 be interpreted as having any dependency or requirement relating to any one or combination of components illustrated in the exemplary operating environment 900.

The invention is operational with numerous other general purpose or special purpose computing system environments or configurations. Examples of well-known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 9, an exemplary system for implementing various aspects of the invention may include a general purpose computing device in the form of a computer 910. Components of the computer 910 may include, but are not limited to, a processing unit 920, a system memory 930, and a system bus 921 that couples various system components including the system memory to the processing unit 920. The system bus 921 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 910 typically includes a variety of computer-readable media. Computer-readable media can be any available media that can be accessed by the computer 910 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 910. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media.

The system memory 930 includes computer storage media in the form of volatile and/or nonvolatile memory such as read only memory (ROM) 931 and random access memory (RAM) 932. A basic input/output system 933 (BIOS), containing the basic routines that help to transfer information between elements within computer 910, such as during start-up, is typically stored in ROM 931. RAM 932 typically contains data and/or program modules that are immediately accessible to and/or presently being operated on by processing unit 920. By way of example, and not limitation, FIG. 9 illustrates operating system 934, application programs 935, other program modules 936 and program data 937.

The computer 910 may also include other removable/non-removable, volatile/nonvolatile computer storage media. By way of example only, FIG. 9 illustrates a hard disk drive 941 that reads from or writes to non-removable, nonvolatile magnetic media, a magnetic disk drive 951 that reads from or writes to a removable, nonvolatile magnetic disk 952, and an optical disk drive 955 that reads from or writes to a removable, nonvolatile optical disk 956 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 941 is typically connected to the system bus 921 through a non-removable memory interface such as interface 940, and magnetic disk drive 951 and optical disk drive 955 are typically connected to the system bus 921 by a removable memory interface, such as interface 950.

The drives and their associated computer storage media, described above and illustrated in FIG. 9, provide storage of computer-readable instructions, data structures, program modules and other data for the computer 910. In FIG. 9, for example, hard disk drive 941 is illustrated as storing operating system 944, application programs 945, other program modules 946 and program data 947. Note that these components can either be the same as or different from operating system 934, application programs 935, other program modules 936, and program data 937. Operating system 944, application programs 945, other program modules 946, and program data 947 are given different numbers herein to illustrate that, at a minimum, they are different copies. A user may enter commands and information into the computer 910 through input devices such as a tablet, or electronic digitizer, 964, a microphone 963, a keyboard 962 and pointing device 961, commonly referred to as mouse, trackball or touch pad. Other input devices not shown in FIG. 9 may include a joystick, game pad, satellite dish, scanner, or the like. These and other input devices are often connected to the processing unit 920 through a user input interface 960 that is coupled to the system bus, but may be connected by other interface and bus structures, such as a parallel port, game port or a universal serial bus (USB). A monitor 991 or other type of display device is also connected to the system bus 921 via an interface, such as a video interface 990. The monitor 991 may also be integrated with a touch-screen panel or the like. Note that the monitor and/or touch screen panel can be physically coupled to a housing in which the computing device 910 is incorporated, such as in a tablet-type personal computer. In addition, computers such as the computing device 910 may also include other peripheral output devices such as speakers 995 and printer 996, which may be connected through an output peripheral interface 994 or the like.

The computer 910 may operate in a networked environment using logical connections to one or more remote computers, such as a remote computer 980. The remote computer 980 may be a personal computer, a server, a router, a network PC, a peer device or other common network node, and typically includes many or all of the elements described above relative to the computer 910, although only a memory storage device 981 has been illustrated in FIG. 9. The logical connections depicted in FIG. 9 include one or more local area networks (LAN) 971 and one or more wide area networks (WAN) 973, but may also include other networks. Such networking environments are commonplace in offices, enterprise-wide computer networks, intranets and the Internet.

When used in a LAN networking environment, the computer 910 is connected to the LAN 971 through a network interface or adapter 970. When used in a WAN networking environment, the computer 910 typically includes a modem 972 or other means for establishing communications over the WAN 973, such as the Internet. The modem 972, which may be internal or external, may be connected to the system bus 921 via the user input interface 960 or other appropriate mechanism. A wireless networking component such as comprising an interface and antenna may be coupled through a suitable device such as an access point or peer computer to a WAN or LAN. In a networked environment, program modules depicted relative to the computer 910, or portions thereof, may be stored in the remote memory storage device. By way of example, and not limitation, FIG. 9 illustrates remote application programs 985 as residing on memory device 981. It may be appreciated that the network connections shown are exemplary and other means of establishing a communications link between the computers may be used.

An auxiliary subsystem 999 (e.g., for auxiliary display of content) may be connected via the user interface 960 to allow data such as program content, system status and event notifications to be provided to the user, even if the main portions of the computer system are in a low power state. The auxiliary subsystem 999 may be connected to the modem 972 and/or network interface 970 to allow communication between these systems while the main processing unit 920 is in a low power state.

Conclusion

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computing environment, a method performed on at least one processor, comprising: a) testing a concurrent program with a plurality of thread schedules to find at least one concurrency bug, including inserting priority lowering points into the concurrent program, and assigning thread priorities via mathematical distribution; b) running a currently highest priority thread that is able to run until a priority lowering point is reached; c) lowering the priority of that thread when the priority lowering point is reached to change the currently highest priority thread to a different thread, including setting the thread's priority to a priority value assigned to the lowering priority point that was reached; and d) returning to step b) until a stopping condition is met.

2. The method of claim 1 wherein assigning the thread priorities via mathematical distribution comprises using random distribution.

3. The method of claim 1 further comprising, choosing a priority lowering point based upon a mathematical distribution.

4. The method of claim 3 wherein choosing the priority lowering point based upon a mathematical distribution comprises using random distribution.

5. The method of claim 1 wherein inserting the priority lowering points comprises identifying synchronization operations and inserting a priority lowering point relative to each synchronization operation.

6. The method of claim 1 wherein inserting the priority lowering points comprises identifying serial execution paths and inserting the priority lowering points only in execution paths that are not serial execution paths.

7. The method of claim 1 wherein types of bugs are classified by depth, and wherein the depth reflects the number of ordering constraints between instructions that are sufficient to trigger the bug.

8. The method of claim 1 wherein testing the concurrent program comprises repeatedly executing the concurrent program up to a number of times based on the expected depth of the bug to provide a probabilistic guarantee of finding any bug having that depth.

9. The method of claim 8 wherein the number of times is further determined by a derandomized algorithm that explores a space of possible random choices to provide an absolute guarantee of finding any bug of a given depth.

10. In a computing environment, a system comprising a processor executing a probabilistic concurrency testing mechanism configured to test a concurrent software program and provides a probabilistic guarantee of finding any concurrent software bug at or below a bug depth, including a scheduler associated with an algorithm, the scheduler is configured to choose a priority lowering point for each thread of which each priority lowering point is assigned a priority value that is lower than any thread's initial thread priority, schedule a currently highest priority thread that is enabled to run until the priority lowering point is reached, and lower the priority of that thread to the priority value assigned to the priority lowering point to change which thread has the currently highest priority and run that thread.

11. The system of claim 10 wherein each thread is assigned an initial thread priority based at least in part upon random mathematical distribution.

12. The system of claim 10 wherein the probabilistic concurrency testing mechanism is further configured to insert the priority lowering points into the concurrent software program by identifying synchronization operations and inserting a priority lowering point relative to each synchronization operation.

13. The system of claim 10 wherein the probabilistic concurrency testing mechanism is further configured to insert the priority lowering points into the concurrent software program by identifying serial execution paths and inserting the priority lowering points only in execution paths that are not serial execution paths.

14. One or more computer-readable storage media having computer-executable instructions, which when executed perform steps, comprising: a) inserting priority lowering points into a concurrent program, each priority lowering point assigned a priority value; b) assigning initial thread priorities to program threads via random mathematical distribution; c) running a currently highest priority thread that is able to run until a priority lowering point is reached; d) lowering the priority of the thread that reached the priority lowering point to the priority value assigned to that priority lowering point, so as to change the currently highest priority thread to a different thread; and e) returning to step c) until a stopping condition is met.

15. The one or more computer-readable storage media of claim 14 wherein a bug depth level, a number of threads and an amount of priority lowering points is known, and having further computer-executable instructions comprising, repeatedly executing the concurrent program up to a number of times that corresponds to the bug depth, the number of threads and the number of priority lowering points so as to provide a probabilistic guarantee of finding bugs at or below the bug depth level.

16. The one or more computer-readable storage media of claim 14 wherein inserting the priority lowering points comprises identifying synchronization operations and inserting a priority lowering point relative to each synchronization operation.

17. The one or more computer-readable storage media of claim 14 wherein inserting the priority lowering points comprises identifying serial execution paths and inserting the priority lowering points only in execution paths that are not serial execution paths.

18. The one or more computer-readable storage media of claim 14 wherein the stopping condition corresponds to having no enabled threads.

19. The system of claim 10, wherein the scheduler is further configured to choose the priority lowering point for each thread based upon a mathematical distribution.

20. The system of claim 10, wherein the scheduler is further configured to assign initial thread priorities based upon a mathematical distribution.

* * * * *